INVENTOR.
TOSHIO MITSUI

BY
Ostrolenk, Faber, Gerb & Soffen
ATTORNEYS

INVENTOR.
TOSHIO MITSUI

BY

Ostrolenk, Faber, Gerb & Soffen
ATTORNEYS

United States Patent Office 3,443,032

Patented May 6, 1969

3,443,032

CONTROL SYSTEM USING CONTINUOUS TONE AND PULSED CODE SIGNALS

Toshio Mitsui, Tokyo, Japan, assignor to Nippon Electric Company Limited, Tokyo, Japan Filed June 17, 1966, Ser. No. 558,393
Claims priority, application Japan, June 19, 1965, 40/36,244
Int. Cl. H04m *11/06, 1/70, 3/16*
U.S. Cl. 179—2 8 Claims The instant invention relates in general to control systems applicable to terminating sets as accessories to subscriber telephones such as "automatic answering and recording devices" and more particularly to a new and improved method for controlling terminating sets of this kind after a telephone line has been established from a calling telephone to a terminating set by transemitting a prescribed pulsed code signal at a particular voice frequency over the telephone line.

The term "controlling" as herein referred to is defined as the change in initial state of the terminating set by placing the terminating set in some other state desired by a user of this system, for example, from recording to playback state or vice versa, when the user who is away from his subscriber telephone dials his telephone number from another telephone set to check if any messages have been recorded on recording medium in his terminating set or leave his new message thereon.

Further, the term "a terminating set" as referred to hereinabove and hereinafter is meant, it will be understood, any kind of telephone-line-terminating set to be used as an accessory to a subscriber telephone, provided it can change its present state to some other state so as to conform to the subscriber's request whenever he performs a prescribed procedure as will be detailed afterwards, after a telephone line has been established to his terminating set from another telephone, a typical example being an automatic answering and recording device.

Among conventional control systems that have been applied to such terminating sets is the one commonly called "the voice-frequency control system" which adopts a so-called "electronic key" for its operation. Whereas this system bears a resemblance to the present control system in that telephone lines are used as a signal transmission medium, it differs from conventional control systems in that continuous voice frequencies are used as they are.

Accordingly, the present control system is characterised by providing a particular voice frequency or frequencies which are translated into pulsed code signals for transmission over a telephone line.

With the conventional voice-frequency control system, it is well anticipated that a usable voice-frequency band assigned to a telephone communication network will be restricted more and more in the future with an increase in the number of subscriber telephones equipped with terminating sets such as automatic answering and recording devices.

Accordingly, an object of this invention is to provide a new and improved control system which provides a solution to the above-mentioned situation by translating a single voice frequency, for example, into digital pulsed code signals to be transmitted over telephone lines so that numerous pulsed codes to be assigned to as many such particular subscriber telephones as possible may be made available for controlling such terminating sets.

Another object of this invention is to provide as simple a circuit arrangement as possible for controlling such a terminating set by use of a predetermined one of a number of pulsed code combinations so that the controlling operation for the terminaitng set is not disturbed by external causes.

Now the features of the control system according to this invention will become more apparent from the following description taken in conjunction with a preferred embodiment of this invention illustrated in schematic diagram form in the accompanying drawings, in which.

Figure 1:
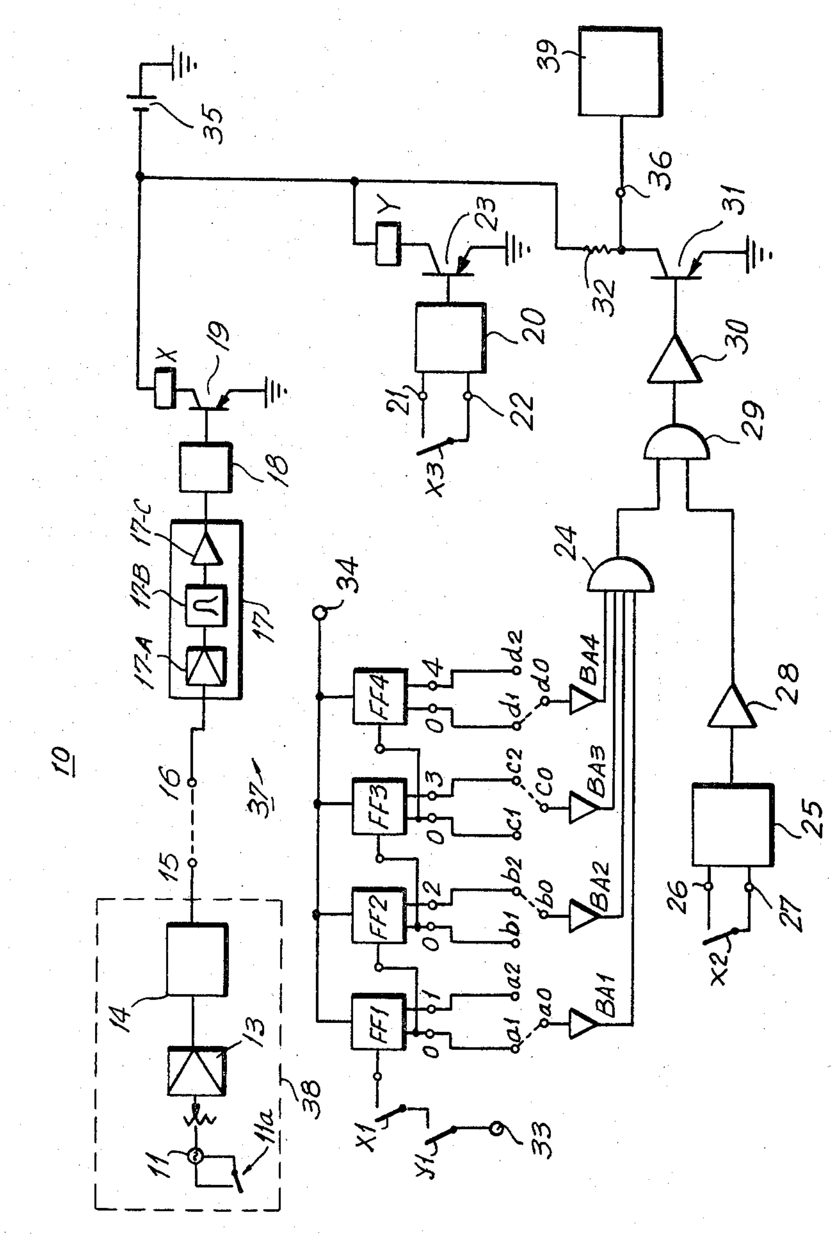
FIGURE 1 is a simplified schematic block diagram illustrating a circuit arrangement for a voice-frequency oscillator unit provided with a voice-frequency signal/pulsed-code signal translating facility and a terminating set for use with a subscriber telephone for a preferred embodiment of the control system according to this invention.

FIGURE 1 illustrates in schematic diagram from an answering system 10 comprising a code signal generating unit 11, a telephone line 15–16 and the controlling part of a terminating set 37 to be installed as an accessory to a subscriber telephone for controlling the controlled part of the terminating set (unillustrated for simplicity) such as an automatic answering and recording device.

It will be understood therefore that the present control system consists of the code signal generating unit 11 which is substantially a voice-frequency oscillator 12 combined with a voice-frequency signal/pulsed-code signal translator, a telephone line as information conveying medium, and the terminating set, said terminating set further consisting of the controlling part and the controlled part, which are designed, in most cases, to be integral with each other and installed near a particular subscriber telephone.

Referring to FIGURE 1:

11 denotes a voice-frequency oscillator;

12 denotes a volume control;

13 denotes an amplifier;

14 denotes a unit for translating a voice-frequency signal into a pulsed code signal such as a dialing unit;

15 denotes a terminal for connection of a telephone line through which a remote control signal generated from the oscillator/translator unit is applied to the terminating set;

16 denotes a terminal for connection of a telephone line through which the terminating set is connected;

17 denotes a tuning unit for the remote control signal wherein 17–A is a limiting amplifier, 17–B a tuning element (i.e., filter), and 17–C is a D.C. amplifier;

18 denotes a limiting amplifier for shaping the waveform of an "ON" "OFF" pulsed signal;

19 denotes a switching transistor; X is a relay which operates in response to "ON," "OFF" pulses contained in the remote control signal;

20 denotes a gate circuit which operates for a prescribed time interval upon application of an input signal at terminal 16 for preventing misoperation due to the voice frequency in speech frequencies which is the same as the voice frequency developed from the oscillator and for obtaining an output signal from the input signal, 21 and 22 being the input terminals of the gate circuit;

23 denotes a switching transistor; Y is a relay which is operated by the switching transistor 23;

Each of $FF_1$–$FF_4$ is a bistable flip-flop circuit;

Each of $BA_1$–$BA_4$ denotes a buffer amplifier.

Letter symbols with subscripts $a_1$, $a_2$, $a_0$; $b_1$, $b_2$, $b_0$; $c_1$, $c_2$, $c_0$; and $d_1$, $d_2$, $d_0$ denote output terminal trios for selection of a desired digital code by suitably connecting the terminals in a selective manner between the output of $FF_1$–$FF_4$ and the input of $BA_1$–$BA_4$.

Referring again to FIGURE 1:

24 denotes an "AND" gate circuit;

25 denotes a timer circuit having input terminals 26 and 27 respectively;

28 denotes a buffer amplifier;

29 is an "AND" gate circuit for combining a signal from "AND" gate circuit 24 with a signal from buffer amplifier 28;

30 denotes a buffer amplifier;

31 denotes a switching transistor;

32 denotes a load resistance for the switching transistor;

33 denotes an input terminal for the flip-flop circuits;

34 denotes a reset terminal for the flip-flop circuits;

35 denotes a D.C. power source;

36 denotes an output terminal from which the controlling output is derived;

$x_1$, $x_2$, $x_3$ and $y_1$ denote respectively, the contacts of relay X and those of relay Y.

Let it be assumed that the output terminals $a_1$, $b_2$, $c_2$ and $d_1$ of the flip-flop circuits $FF_1$–$FF_4$ are respectively connected as $a_1$–$a_0$, $b_2$–$b_0$, $c_2$–$c_0$, and $d_1$–$d_0$ in a manner as illustrated by dashes.

Upon reception by the terminating set of a continuous gating signal at a particular voice frequency for a predetermined time interval and a succeeding coded pulse signal at the same voice frequency which have been transmitted over a telephone line, switching transistor 19 is turned "ON" through tuning element 17 in the terminating set, so as to operate relay X.

The operation of relay X closes contacts $X_1$–$X_3$. Contacts $X_1$ prepare for operation of the flip-flop circuits $FF_1$–$FF_4$.

Contacts $X_2$ apply an input signal to timer circuit 25 while contacts $X_3$ apply an input signal to gate circuit 20 for preventing misoperation due to the same voice frequency contained in speech as the oscillator signal voice frequency.

The gate circuit 20 causes the switching transistor 23 to turn "ON" in several seconds after application of the input signal, whereby relay Y is operated.

Figure 2:
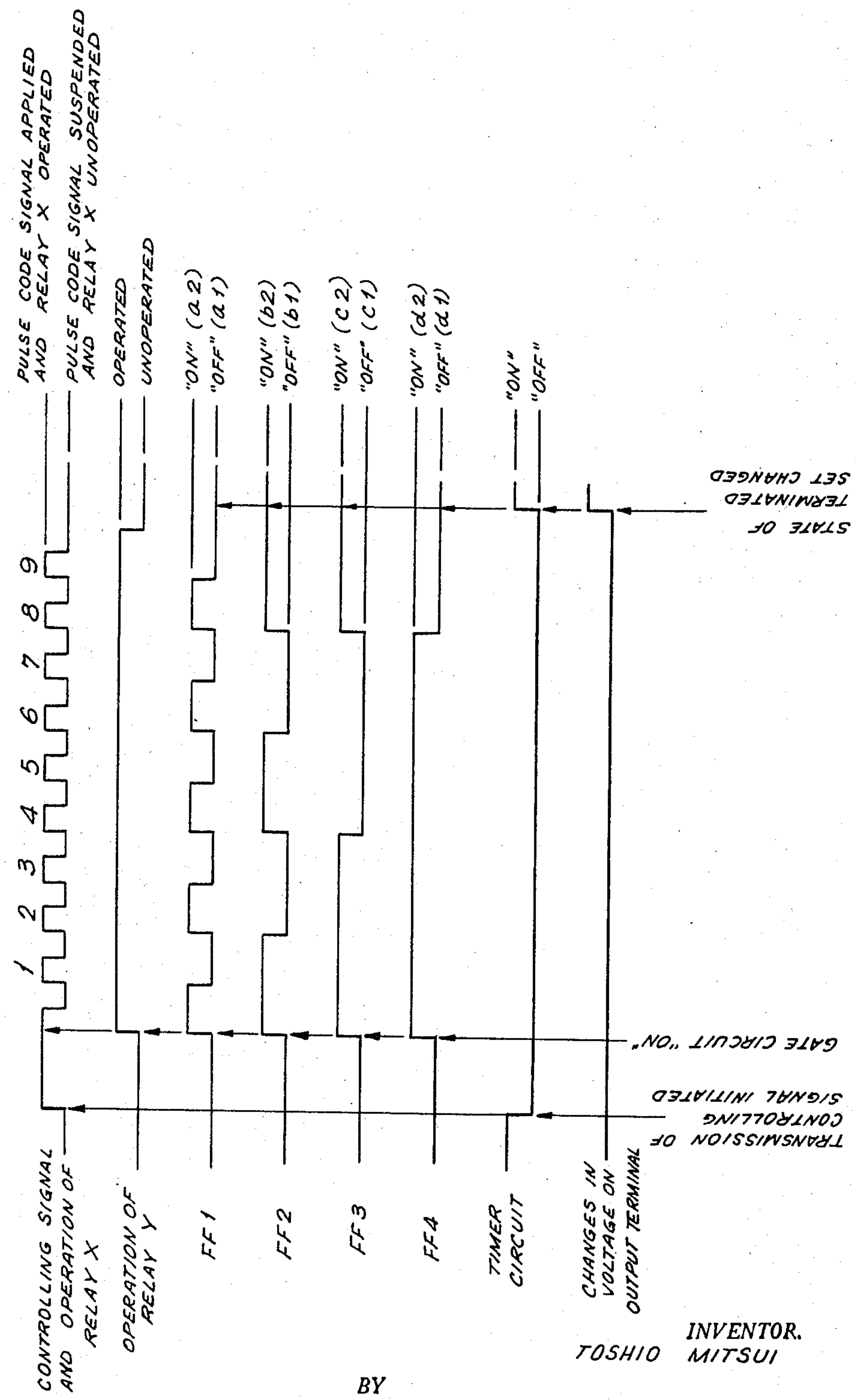
FIGURE 2 is a waveform diagram illustrating operations of the principal circutis involved in the terminating set shown in FIGURE 1 upon reception of a voice-frequency pulsed code signal by the set over a telephone line from an external voice-frequency oscillator/translator unit as illustrated in FIGURE 1.

Operation of relay Y closes contacts $y_1$. Thus when an input signal is applied to the input terminal 33 of the flip-flop circuits through contacts $x_1$ which have been closed and contacts $y_1$ which are closed with operation of relay Y, the input signal is applied to flip-flop $FF_1$ and subsequently to $FF_2$–$FF_4$ as these flip-flops change state. The pulses applied to input terminal 33 may preferably originate at the calling location 38 and be developed by dialing one or more times to produce a prescribed number of pulses to be identified by the flip-flop circuits $FF_1$–$FF_4$. This may be considered to be exactly the same state as if one pulse in a pulsed code signal consisting of a succession of pulses were applied. Therefore, the succeeding pulses should be counted from "2." In other words, application of an "ON," "OFF" signal consisting of nine pulses to the terminating set after a predetermined gating time interval as illustrated in FIG. 2, is equivalent to reception of an "ON," "OFF" signal consisting of ten, or nine plus one, pulses by the flip-flop circuits.

This is to say that a circuit arrangement incorporating $n$ flip-flop circuits is capable of discriminating $2n-1$ different kinds of information from one another.

Suppose now that, with reference to FIG. 2, the flip-flop circuits $FF_1$–$FF_4$ are under the condition as follows:

$FF_1$ is turned "OFF"; $FF_2$ "ON"; $FF_3$ "ON"; and $F_4$ "OFF," while terminals are connected with reference to FIGURE 1 as $a_1$–$a_0$, for $FF_1$; $b_2$–$b_0$ for $FF_2$; $c_2$–$c_0$ for $FF_3$; and $d_1$–$d_0$ for $FF_4$. With the flip-flops in the above states their "0," "2," "4" and "0" outputs respectively are in the "ON" or "ONE" state.

The "ON" signals are delivered to "AND" gate circuit 29 through terminals $a_1$, $b_2$, $c_2$ and $d_2$ respectively, the buffer amplifiers $BA_1$–$BA_4$ respectively, and "AND" gate 24.

On the other hand, the timer circuit 25 remains in the "OFF" state so long as the pulsed code is being received, so that the possibility (for instance, arising from a careless or malicious conduct by another subscriber who owns a terminating set) of the "AND" gate circuit 29 becoming "ON" by an irregular "ON," "OFF" signal consisting of pulses more than the regular number can be eliminated.

After a predetermined time interval elapses from the instant of interruption of the continuous voice-frequency signal after the pulsed code signal has been received, the timer circuit 25 is turned "ON." Subsequently, "AND" gate circuit 29 is turned "ON" upon delivery of an "ON" signal indicating the turning "ON" of the timer circuit 25 to the gate circuit 29 via buffer amplifier 28. Therefore, the "AND" gate circuit 29 causes the switching transistor 21 to operate through the buffer amplifier 30. This operation causes the voltage on the controlling signal output terminal 36 to be altered (i.e., from conduction to cut-off or vice versa) and hence, the recording state to be changed to the playback state or vice versa as required when the present control system is applied to an automatic answering and recording device, for example.

Operation of this control system will be outlined by reference to a concrete example. For instance; if a subscriber away from this office wants to check to determine if any messages have been taken down on magnetic tape (for example) in an automatic answering and recording device at his office, he should proceed as follows:

At first, he dials his regular telephone number to establish a telephone line to his telephone equipped with a terminating set; upon successful placement of the call, he turns "ON" power switch on a portable oscillator/translator unit 38 and the unit is either coupled to or positioned in close proximity to a telephone handset from which a call was initiated by him, and after confirming that the signal tone has been transmitted for a predetermined time interval he dials a prescribed digit. Then he can check for or listen to any messages that have been recorded on tape. The digital pulses may be generated from the conventional dialing mechanism of the telephone handset or by any other suitable means.

While the novel features of this invention have been described as applied to the preferred embodiment illustrated on the accompanying drawing, it is to be understood that various omissions, substitutions, and modifications could be made by those skilled in the art without substantially departing from the spirit of this invention.

As could be readily surmised by those skilled in the art, this control system can claim, it is believed, to hold a great deal of practical utility as applied to subscriber telephone lines accommodated in a telephone exchange system for which the usable voice frequency band is going to be restricted more and more in the future for the following advantages:

(1) Even if a single voice frequency is used, numerous code combinations consisting of various numbers of pulses are available to obtain many different code signals, whereby reliable controlling operations for numerous terminating sets can be expected.

(2) Accordingly, the number of subscriber telephones equipped with terminating sets in a telephone exchange system can be greatly increased by application of this system.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Means capable of controlling equipment is response to receipt of appropriate tone and pulse controlling signals transmitted from a remote location through a communications medium such as a telephone circuit comprising:
 first means coupled to the media and being energized responsive to receipt of a tone frequency signal lying within a narrow frequency band;
 timing means being turned "ON" upon energization of said first means and including means to generate a first "ON" signal at its output when the duration of energization of said first means is maintained for a predetermined time period;
 multistage register means;
 second means coupled to said first means being energized by said first means to couple the input of said register means to the communications media;
 said second means including a plurality of connected flip-flops arranged to develop a count in said register responsive to the pulse controlling signals;
 third gating means having a plurality of inputs selectively coupled to output terminals of said register means and being enabled to generate a second "ON" signal upon receipt of a predetermined number of pulses;
 an output switch;
 fourth gating means having inputs coupled to the outputs of said third gating means and said timing means for operating the output switch when said timing means and said third gating means both produce "ON" signals.

2. The device of claim 1 wherein said first means is comprised of a tuned circuit for passing tone frequency signals lying within a narrow predetermined bandwidth;
 detector means for converting the tone frequency signal lying within said predetermined bandwidth to a D.C. signal.

3. The device of claim 2 wherein said second means connecting said register means to said communications media is comprised of first relay means coupled to said detector means and having contact means coupling said register means to said communications media when said first relay means is energized.

4. The device of claim 3 wherein said first relay means is further comprised of second contact means coupled to said timing means for energizing said timing means when said first relay means is energized.

5. The device of claim 4 further comprising second relay means;
 said first relay means including third contact means coupled to said second relay means for energizing said second relay means when said first relay means is energized;
 said second relay means including fourth contact means connected between said first contact means and said communications media for connecting said first contact means to said communications media when said second relay means is energized.

6. The device of claim 5 wherein the flip-flop stages of said register means each have two output terminals;
 plural adjustable switch means each being associated with one flip-flop stage and one input terminal of said third gating means;
 each of said adjustable switch means including a switch arm for selectively coupling one of the two output terminals of its associated flip-flop stage to one of said third gating means input terminals for making the third gating means responsive to a predetermined number of pulses applied to said register means.

7. A system for controlling a device associated with one telephone handset by means associated with a second telephone handset remotely positioned relative to said one telephone handset and connectible through a telephone circuit comprising:
 normally deenergized oscillator means for generating a signal of a predetermined frequency located at said second telephone handset;
 said oscillator means including manually operable means for energizing said oscillator means;
 first means for generating a predetermined number of pulses located at said second telephone handset;
 second controlling means located at said one telephone handset comprising:
  filter means for passing only said predetermined frequency signal;
  first relay means coupled to said filter means being energized upon receipt of said predetermined frequency signal;
  said first relay means including first and second normally open contact sets;
 normally deenergized timing means;
 said first contact set being coupled to said timing means and being closed when said first relay means is energized to start said timing means;
 said timing means generating an "ON" signal at its output when said first contact means remains closed for a predetermined time period;
 multistage register means;
 said second contact means being arranged between the input of said register means and the telephone circuit for coupling said register means and said telephone circuit when said first relay means is energized;
 a first "AND" gate having a plurality of inputs;
 third means for selectively coupling the output terminals of said register means to said "AND" gate inputs to generate a second "ON" signal at the "AND" gate output upon receipt of a predetermined number of pulses from said second telephone handset location;
 a second "AND" gate having inputs coupled to said timing means and said first "AND" gate for generating an output upon receipt of both said first and second "ON" signals;
 switch means coupled between said second "AND" gate and the device being controlled being operative under control of said second "AND" gate for controlling the operation of said device.

8. A method for controlling a device such as an automatic telephone answering means located at a first telephone handset from a second remotely located telephone handset comprising the steps of:
 calling said first telephone handset from said second telephone handset;
 transmitting a continuous tone signal of a predetermined frequency from said second telephone handset for a predetermined period of time;
 transmitting a predetermined number of pulses from said second telephone handset subsequent to termination of said predetermined period of time;
 receiving said continuous tone signal;
 determining whether said tone signal is of a predetermined frequency;
 determining the duration of transmission of said tone signal;
 receiving said pulses;
 determining whether said pulses are of a predetermined number;
 initiating operation of said device only if said tone signal is of a predetermined frequency and persists for said predetermined time period and if the number of received pulses are equal to a predetermined number.

References Cited

UNITED STATES PATENTS

| | | | |
|---|---|---|---|
| 2,784,254 | 3/1957 | Lane | 179—6 |
| 3,046,526 | 7/1962 | Scantlin | 340—168 |
| 3,308,239 | 3/1967 | Waldman | 179—2 |

FOREIGN PATENTS 421,059 12/1934 Great Britain.

BERNARD KONICK, *Primary Examiner.*

R. F. CARDILLO, Jr., *Assistant Examiner.*

U.S. Cl. X.R.

179—6; 340—168